United States Patent [19]

Greer

[11] 4,249,598
[45] Feb. 10, 1981

[54] OUTDOOR WELL DEPTH INDICATOR

[76] Inventor: Henry R. Greer, Rte. 5, Fayetteville, Ga. 30214

[21] Appl. No.: 65,979

[22] Filed: Aug. 13, 1979

[51] Int. Cl.³ .................... E21B 34/02; E21B 47/04
[52] U.S. Cl. .................... 166/54; 116/228; 73/321; 166/113; 417/40
[58] Field of Search ............ 166/54, 113; 116/228; 73/321; 417/40, 211.5, 297.5

[56] References Cited

U.S. PATENT DOCUMENTS

| | | | |
|---|---|---|---|
| 2,371,339 | 3/1945 | Markwark | 417/40 |
| 2,677,816 | 5/1954 | Quisr | 116/228 |
| 3,384,178 | 5/1968 | Agnew et al. | 166/54 |
| 3,754,360 | 8/1973 | Herr | 52/105 X |
| 4,065,226 | 12/1977 | Campbell | 417/40 |

FOREIGN PATENT DOCUMENTS 22311  4/1935  Australia .................... 116/228

*Primary Examiner*—William F. Pate, III
*Attorney, Agent, or Firm*—Jones, Thomas & Askew

[57] ABSTRACT

An outdoor well depth indicator including a sleeve vertically slidable along a pipe extending above the well house and connected by a line to a float on the surface of the water in the well. The indicator sleeve can be seen from a distance and from any direction around a well. Also disclosed is a cutoff system for terminating a supply of water from the well when the level of water in the well reaches a minimum desired level, without immediately shutting off the pump motor.

8 Claims, 4 Drawing Figures

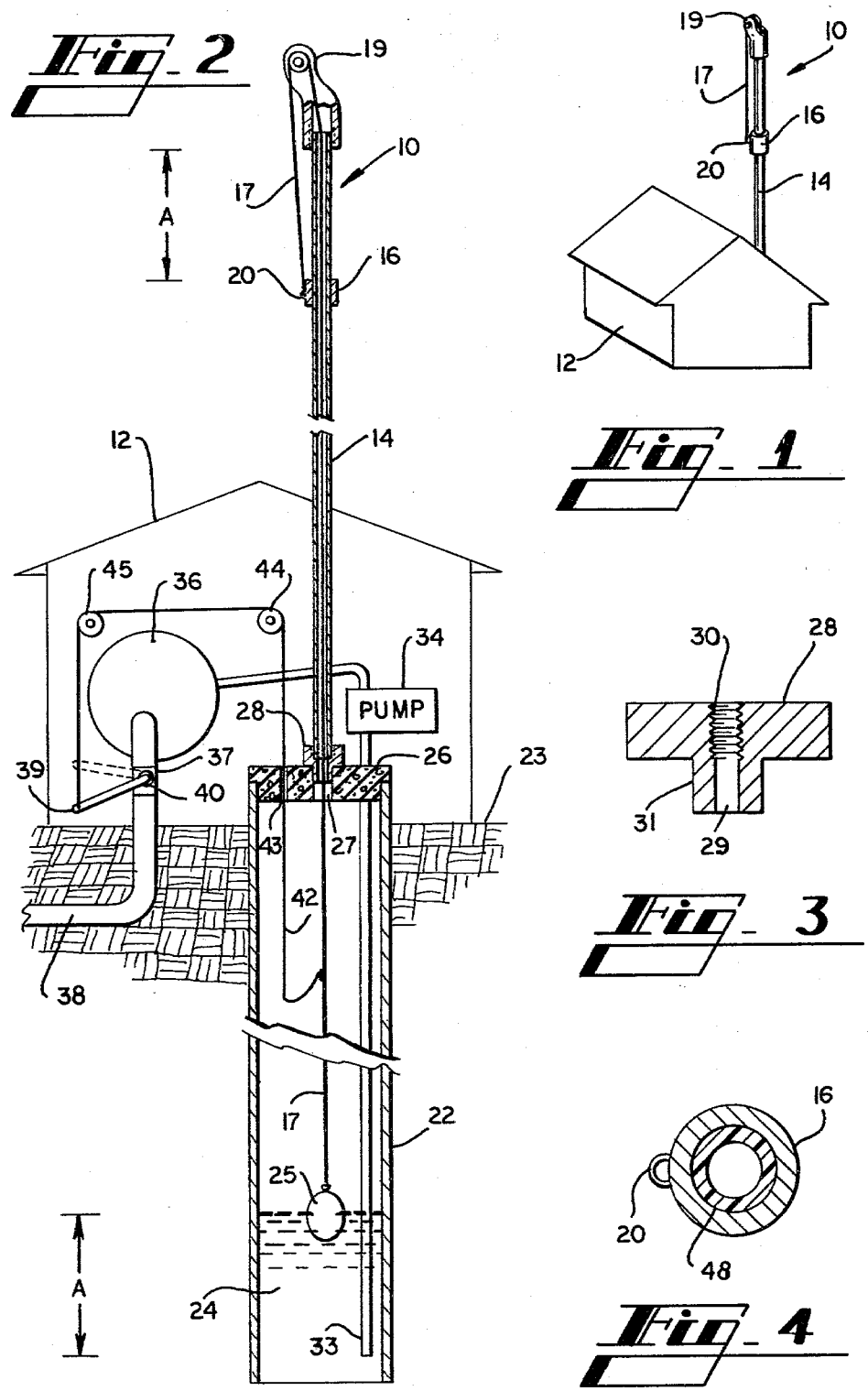

OUTDOOR WELL DEPTH INDICATOR

TECHNICAL FIELD

The present invention relates to devices for indicating the level of a fluid in a reservoir, and more particularly relates to an outdoor depth indicator for a shallow bored well.

BACKGROUND OF THE INVENTION

Various types of depth indicators are known in the prior art for providing information regarding the depth of liquid in a well or storage tank. Problems have arisen, however, in the viewing of the depth indication given by such devices because of their relative complexity. In particular, it is difficult to read such devices from remote positions. Some such prior art apparatus provide a numerical indication of the depth of fluid on a counter or a tape, or by moving a pointer relative to a scale, and such indicators are generally located within a housing that must be opened for viewing, requiring the presence of the viewer at the well or tank. Viewing becomes even more difficult after dark since some form of lighting must be provided in order to view the counter or scale.

Another problem in the art of monitoring the depth of a well is automatically stopping the withdrawal of water from the well when the depth of water in the well reaches a certain minimum level. Prior art devices for accomplishing this purpose have generally included a means for stopping the well pump motor when the minimum level is reached. This can cause a foot valve normally associated with the pump to leak, allowing the pump to become unprimed.

SUMMARY OF THE INVENTION

The present invention solves the above-described problems in the prior art by providing an outdoor well depth indicator that can be easily viewed from a remote location in any direction from the well depth indicator.

Generally described, the outdoor well depth indicator of the present invention comprises a vertical support member mounted above the well, a pulley mounted on the vertical support member, a sleeve member slidably received about the vertical support member below the pulley, a float on the surface of the water in the well, an indicator line connected at one end thereof to the float, the indicator line passing around the pulley and being attached at the other end thereof to the sleeve member, whereby the sleeve member moves along the vertical support member responsive to variations in the depth of water in the well.

The vertical support member preferably comprises a hollow cylindrical pipe through which the indicator line can pass between the float and the pulley. The vertical support member extends above the roof of a well house which encloses the pump, the well and a pressurized holding tank. A cylindrical sleeve travels vertically along the pipe above the well house and is coated with a luminous substance, so that the sleeve member, which indicates the depth of water in the well, can be viewed from any direction, day or night. Because the depth indicator is above the well house, the approximate depth of water in the well can be ascertained by viewing the position of the sleeve member along the pipe from a substantial distance away; for example, it would often be visible from the residence of the owner of the well.

The preferred embodiment of the present invention includes a means for preventing removal of water from the well responsive to a predetermined amount of downward movement of the float. Such means can comprise a valve positioned in a water main connected to the well, a lever switch connected to the stopcock of the valve, a cutoff line attached at one end thereof to the indicator line within the well, and at the other end thereof to the lever switch, and a means for guiding the cutoff line between the indicator line and the lever switch along a path such that upon downward movement of the float and indicator line, the cutoff line causes the lever switch to rotate the stopcock and to close the valve. Thus, the automatic cutoff system of the present invention operates by cutting off the water supply from the well rather than by stopping the pump motor. When the cutoff system of the present invention is utilized, the pump motor will not be stopped until a holding tank is pressurized in a normal fashion, so that the pump will not become unprimed.

Thus, it is an object of the present invention to provide an improved outdoor well depth indicator.

It is a further object of the present invention to provide an outdoor well depth indicator wherein the depth of water in the well is indicated by a sleeve member traveling up and down on a vertical support responsive to the rising and falling of a float on the surface of the water in the well.

It is a further object of the present invention to provide a well depth indicator that can be viewed from remote points located in all directions from the well.

It is a further object of the present invention to provide a well depth indicator that can be viewed after dark from locations remote from the well.

It is a further object of the present invention to provide a well depth indicator including a means for automatically terminating delivery of water from the well without immediately stopping the well pump motor.

Other objects, features and advantages of the present invention will become apparent from reading the following specification when taken in conjunction with the accompanying drawing.

BRIEF DESCRIPTION OF THE DRAWING

FIG. 1 is a pictorial view of a well house and well depth indicator embodying to the present invention.

FIG. 2 is a cross sectional view of a well and well depth indicator embodying the present invention, showing the pump and water supply system diagrammatically.

FIG. 3 is a vertical cross sectional view of a fitting for mounting the depth indicator in the cap of the well.

FIG. 4 is a horizontal cross sectional view of an embodiment of an indicator sleeve according to the present invention.

DETAILED DESCRIPTION

Referring now in more detail to the drawing, in which like numerals indicate like parts throughout the several views, FIG. 1 shows a pictorial view of a well depth indicator 10 according to the present invention, extending above a well house 12. The outdoor portions of the well depth indicator 10 include a vertically disposed hollow pipe 14 which carries a cylindrical indicator sleeve 16 that is slidably movable along the pipe 14 and is connected to an indicator line 17. The indicator line 17 passes around a pulley 19, mounted at the top of the pipe 14, and down through the hollow center of the pipe 14.

FIG. 2 shows a cross sectional view of the depth indicator 10 and a well. It will be seen that the pulley 19 is threaded onto the top of the pipe 14, and the indicator line 17 is tied to the eyelet 20 on the side of the indicator sleeve 16. The well is defined by a well liner 22 extending into the ground 23 a sufficient distance to be below the water table, so that water 24 seeps into the well. A float 25 is located on the surface of the water 24 and is attached to the other end of the indicator line 17. At the top of the well liner 22 within the well house 12, a well cap 26, normally comprising concrete, is fitted onto the well liner 22. The well cap 26 defines an opening 27 therethrough, connecting the well with the interior of the well house.

A pipe support fitting 28, shown in detail in FIG. 3, rests on the well cap 26, and a neck 31 of the fitting 28 protrudes downwardly into the opening 27 in the well cap 26. The neck 31 is shaped to be matingly received by the opening 27. The fitting 28 includes a central vertical opening 29 that includes a threaded portion 30 at the upper end thereof. The vertical support pipe 14 is threaded at the bottom portion thereof into the fitting 28, so that the pipe 14 is supported by the fitting 28 and by the roof of the well house 12 where the pipe 14 extends therethrough.

A supply pipe 38 is positioned with its lower end in the water in the well in a manner known to those skilled in the art, and extends through the well cap 26 to a pump 34, shown diagrammatically in FIG. 2. Water pumped by the pump 34 from the well enters a pressurized holding tank 36 which accumulates water until a pressure is reached which facilitates delivery of water for normal use. When such predetermined pressure is reached in the holding tank 36, the motor of the pump 34 is automatically stopped in a manner known to those skilled in the art. Water is delivered from the holding tank 36 for use through a water main 38.

In a system according to the present invention, the water main 38 includes a cutoff valve 37 which includes a stopcock 40. A lever switch 39 is fixedly attached to the stopcock 40 at its inner end. The outer end of the lever switch 39 is connected to a cutoff line 42 that passes through a cutoff line opening 43 in the well cap 26 and is attached at its other end to the indicator line 17 within the well. The path of the cutoff line 42 outside the well is defined by a pair of pulleys 44 and 45 which are mounted (by means not shown) such that the pulley 45 is located directly over the outer end of the lever switch 39. Thus, when the indicator line 17 moves downwardly until tension is placed on the cutoff line 42, the lever switch 39 is gradually raised until the stopcock 40 of the valve 37 is rotated to a position where the water main 38 is blocked. The lever switch 39 is weighted sufficiently so that it falls and opens the valve 37 when tension on the cutoff line 42 is relaxed as the indicator line 17 within the well rises. The point at which the cutoff line 42 is attached to the indicator line 17 is selected so that the valve 37 is closed only when the float 25 has decended to a minimum desired level.

A preferred embodiment of the indicator sleeve 16 is shown in horizontal cross section in FIG. 4. In the embodiment shown in FIG. 4, the indicator sleeve 16 includes an inner sleeve bearing 48 that can be, for example, a Nylon sleeve, the purpose of which is to reduce friction between the sleeve 16 and the pipe 14.

The sleeve 16 also preferably is coated on its exterior surface with a luminous substance so that the sleeve 16 can be seen after dark.

In the installation of a well depth indicator 10 embodying the present invention, the opening 37 and the cutoff line opening 43 are drilled in the concrete well cap 26, the opening 37 having a diameter just large enough to receive the neck 31 of the fitting 28. Directly above the opening 37, an opening having a diameter sufficiently large to matingly receive the pipe 14 is cut in the roof of the well house 12. To assemble the indicator 10, the sleeve 16 is slid onto the pipe 14, and the indicator line 17 is threaded through the hollow interior of the pipe 14 and also through the pulley 19. The pulley 19 is then threaded onto the top of the pipe 14 and one end of the indicator line 17 is tied to the eyelet 20 of the sleeve 16. The pipe 14 may then be inserted through the roof of the well house 12, and the line 17 threaded through the opening 29 of the fitting 28 and through the opening 27 in the well cap 26. One end of the cutoff line 42 is similarly threaded through the cutoff line opening 43 into the well.

At this point, the well cap 26 is shifted to allow access to the lines 17 and 42 suspended within the well. The float 25 is placed within the well and attached to the end of the indicator line 17, and the cutoff line 42 is attached to the indicator line 17 at a distance above the float 25 selected so that the cutoff line 42 will be drawn downwardly with the indicator line 17 when the float 25 nears the desired minimum water level. The well cap 26 is then returned to its proper place. The fitting 28 is threaded onto the lower end of the pipe 14 and the pipe and fitting combination are placed with respect to the well cap 26 so that the neck 31 of the fitting 28 enters the opening 27 in the well cap 26.

To calibrate the depth indicator 10, the well is first pumped down to its minimum level. The indicator sleeve 16 is slid to the top of the pipe 14, and the indicator line 17 is retied to the eyelet 20 to hold the sleeve 16 at the top of the pipe 14. The cutoff line 42 is tied to the lever switch 39 to hold the lever switch in its uppermost position wherein it closes the valve 37. It will thus be seen that as water seeps back into the well, the float 25 will rise, the indicator sleeve 16 will drop down the pipe 14 a distance equal to the rise in the water level (shown as distance A in FIG. 2), and the lever switch 39 will fall to return the valve 37 to its open position.

As the water level in the well rises and falls, the position of the indicator sleeve 16 along the pipe 14 indicates the depth of water in the well. The indicator sleeve 16 can be seen from any direction around the well depth indicator 10. The length of the pipe 14 extending above the roof of the well house 12 is selected to be at least as tall as the maximum depth of water in the well above the minimum desired depth. Whenever the float 25 drops with the water level in the well down to the minimum desired level, the indicator sleeve 16 approaches the top of the pipe 14 and the indicator line 17 pulls the cutoff line 42 downwardly until the cutoff line 42 raises the lever switch 39. The stopcock 40 is thereby rotated to a position closing the valve 37 so that water cannot be delivered for use through the water main 38. The water is gradually cut off by the rising lever switch 39, giving a warning to a user that the well is almost dry.

It should be noted that when the valve 37 is closed, the pump 34 is not shut down until the pressure of the water in the holding tank 36 reaches the selected cutoff pressure. Thus, the automatic cutoff of water when the well is "pumped dry" does not result in loss of prime in the pump.

It will thus be seen that a well depth indicator constructed according to the present invention provides greater versatility than prior art devices since it can be read from a distance in any direction, night or day. The particular constructional features of the invention allow it to be easily installed without disrupting the existing plumbing of a well. In addition, one embodiment of the present invention includes an automatic cutoff system which avoids problems of loss of prime of the well pump by cutting off the water main rather than the pump motor. The construction of the well depth indicator utilizing a hollow vertical support pipe protects that portion of the indicator line 17 passing through the pipe.

While this invention has been described in detail with particular reference to preferred embodiments thereof, it will be understood that variations and modifications can be effected within the spirit and the scope of the invention as described hereinbefore and as defined in the appended claims.

I claim:

1. A well depth indicator comprising:
   a vertical support member comprising a hollow pipe mounted above said well;
   a pulley mounted on said vertical support member;
   a sleeve member slidably received about said vertical support member below said pulley;
   a float on the surface of the water in the well; and
   an indicator line connected at one end thereof to said float, said indicator line passing through the hollow center of said pipe and around said pulley and being attached at the other end thereof to said sleeve member, whereby said sleeve member moves along said vertical support member responsive to variations in the depth of water in said well.

2. The apparatus of claim 1 wherein said sleeve member includes a luminous coating thereon.

3. The apparatus of claim 1 further comprising a fitting threadably received about the lower end of said vertical support member and including a downwardly protruding neck shaped to be received in an opening through a cap on said well, said fitting defining a passage therethrough communicating with said hollow vertical support member and said well.

4. The apparatus of claim 1 wherein said sleeve member includes a bearing on the inner surface thereof for reducing friction between said sleeve member and said vertical support member.

5. The apparatus of claim 1 further comprising a means for preventing removal of water from said well responsive to a predetermined amount of downward movement of said float.

6. The apparatus of claim 5 wherein said means for preventing removal of water from said well comprises a valve positioned in a water main connected to said well, a lever switch for opening and closing said valve, a cutoff line attached at one end thereof to said indicator line, within said well, and at the other end thereof to said lever switch, and means for guiding said cutoff line between said indicator line and said level switch along a path such that upon downward movement of said float and indicator line, said cutoff line causes said lever switch to close said valve.

7. A depth indicator for a well comprising:
   a concrete cap over said well and a well house enclosing said well,
   a fitting resting on said concrete cap, said fitting including a neck protruding into an opening through said concrete cap and a threaded passageway through said fitting and said neck;
   a vertical pipe threadably received by said fitting and extending upwardly through a mating opening in said well house a distance above said well house approximately equal to the maximum depth of water in said well;
   a pulley mounted at the top of said pipe on a sheave threaded onto said pipe;
   a cylindrical sleeve member slidably received about the outside of said pipe and including a Nylon lining on the inner surface thereof and a luminous coating on the exterior surface thereof;
   a float on the surface of the water in said well;
   an indicator line connected at one end thereof to said float, said line passing through said fitting and said hollow pipe, around said pulley, and being attached at the other end thereof to said sleeve member;
   a cutoff line attached at one end thereof to said indicator line a predetermined distance above said float; and
   a means attached to the other end of said cutoff line for preventing water from being removed from said well responsive to said cutoff line being pulled into said well a predetermined distance by said float and said indicator line.

8. A well depth indicator comprising:
   a vertical support member mounted above said well;
   a pulley mounted on said vertical support member;
   a sleeve member slidably received about said vertical support member below said pulley;
   a float on the surface of the water in the well;
   an indicator line connected at one end thereof to said float, said indicator line passing around said pulley and being attached at the other end thereof to said sleeve member, whereby said sleeve member moves along said vertical support member responsive to variations in the depth of water in said well; and
   means for preventing removal of water from said well responsive to a predetermined amount of downward movement of said float, comprising a valve positioned in a water main connected to said well, a lever switch for opening and closing said valve, a cutoff line attached at one end thereof to said indicator line, within said well, and at the other end thereof to said lever switch, and means for guiding said cutoff line between said indicator line and said lever switch along a path such that upon downward movement of said float and indicator line, said cutoff line causes said lever switch to close said valve.

* * * * *